(12) United States Patent
Ferguson

(10) Patent No.: US 7,120,724 B2
(45) Date of Patent: Oct. 10, 2006

(54) USB INTERFACE EXTENSION THROUGH SPLIT TRANSACTION PROTOCOL

(75) Inventor: Patrick Lee Ferguson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 10/413,332

(22) Filed: Apr. 14, 2003

(65) Prior Publication Data

US 2004/0205276 A1 Oct. 14, 2004

(51) Int. Cl.
*G06F 13/20* (2006.01)
*G06F 13/42* (2006.01)

(52) U.S. Cl. ...................... 710/313; 710/106
(58) Field of Classification Search ................ 710/305, 710/313, 106
See application file for complete search history.

(56) References Cited

U.S. PATENT DOCUMENTS 6,671,756 B1 * 12/2003 Thomas et al. ............... 710/73
6,708,247 B1 * 3/2004 Barret et al. ................. 710/313
2002/0097220 A1 * 7/2002 Ferguson et al. ............ 345/156
2003/0065839 A1 * 4/2003 Howard et al. .............. 710/100
2004/0268012 A1 * 12/2004 Ferguson .................... 710/313

* cited by examiner

*Primary Examiner*—Rehana Perveen
*Assistant Examiner*—Jeremy S. Cerullo

(57) ABSTRACT

A communication system for extending range of USB communications that may include a host computer system having a USB host controller, a USB hub, and transmitter circuitry. The USB host controller may be configured to operate using a split transaction for the USB communications. The communication system may also include receiver circuitry that receives a non-USB format of USB communication signals as the signals appear between split start and split complete transaction operations at the host computer system. The transmitter circuitry may be configured to forward the non-USB formatted USB communication signals across an extension between the transmitter circuitry and the receiver circuitry. At least one USB user interface device may be communicatively coupled to the receiver circuitry and receives USB communication signals from a receiver hub in the receiver circuitry. The USB communication signals correspond to the non-USB formatted communication signals that appear between the split start and split complete transaction operations at the host computer system.

14 Claims, 5 Drawing Sheets

USB INTERFACE EXTENSION THROUGH SPLIT TRANSACTION PROTOCOL

CROSS-REFERENCE TO RELATED APPLICATIONS

The present application is related to the following U.S. applications which are incorporated herein in their entireties: U.S. application Ser. No. 10/035,757, filed Dec. 31, 2001, entitled "Method Of Connecting To A KVM Transmitter Using Internal Cables" by Ferguson et al. U.S. application Ser. No. 10/035,778, filed Dec. 31, 2001, entitled "Solution For Integrating A KVM Extension Transmitter With A Graphics Controller On An Add-In Card" by Ferguson et al. U.S. application Ser. No. 10/109,134, filed Mar. 28, 2002, entitled "Method Of Supporting Audio For KVM Extension In A Server" by Ferguson et al. and U.S. application Ser. No. 10/109,087, filed Mar. 28, 2002, entitled "Defining A PCI Function Or USB Endpoint For A KVM Extension Device For Enumeration, Manageability, and Security" by Ferguson.

BACKGROUND OF INVENTION

1. Field of the Invention

The present disclosure relates generally to increasing the functionality of a computer USB port and, more specifically, to extending a USB port in conjunction with KVM extension products.

2. Description of the Related Art

Typically, a standard computer interface, or a keyboard, video display and a mouse (KVM), must be located close to the computer to which it is attached. A keyboard/video/mouse (KVM) extender enables a computer interface to be located at a greater distance from the computer than is typically possible with a standard interface. For example, a company can place all its employees' computers in a rack-mounted system in a locked room and yet still provide a standard KVM interface at each employee's desk. To the employee, it appears as though the computer is still located at the employee's desk. This centralization of computers enables companies to maintain tighter security over their computers and also simplifies the computers' maintenance by locating them in a single place.

In addition, a KVM switch can enable multiple computers to be accessed by means of a single set of keyboard, video display and mouse. This is convenient in the situation in which a user accesses multiple computers such as an application server, a web or email server and a game box. With a KVM switch, the user can access multiple computers with a single interface, thus reducing the cost of both components and maintenance.

Although, the KVM extension mode of operation typically supports some standard user I/O protocols, or "legacy" protocols, such as PS/2, analog video, and serial communications, a universal serial bus (USB) connection presents several problems. Most interface extensions such as KVM use simple, low frequency data rates and protocols, whether using either analog or digital signal types. However, USB has a very complex signaling protocol, data packet structure and electrical specification, as well as short latency requirements. The USB standard requires strict adherence to these transaction latency and electrical requirements, which limits the USB extension distance, rather than allow the several hundred meters of a typical KVM mode. In addition, the USB requirements prevent the use of a KVM switch because a switch may degrade the USB signaling and further reduce the overall extension distance. One method of providing USB connectivity over a KVM connection is to switch the native USB signals into KVM extension media and then simply "tune" the transmission to try and achieve 100–200 meters of extension distance. However, there is no guarantee that this type of tuning will achieve the desired result. Another method of extending USB connectivity over a KVM connections is to extend an entire peripheral component interconnect (PCI) bus with a PCI-PCI bridge.

KVM interfaces also enable multiple users to simultaneously access a single computer system. Old methods of accomplishing this include switching PS/2 keyboard and mouse interfaces or physically passing a keyboard and mouse from user to user. One obvious disadvantage of the these old methods is that all but one user is blocked while another user controls the computer.

Many other problems and disadvantages of the prior art will become apparent to one skilled in the art after comparing such prior art with the present invention as described herein.

BRIEF DESCRIPTION OF THE FIGURES

A better understanding of the present invention can be obtained when the following detailed description of the preferred embodiment is considered in conjunction with the following figures.

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENT

Figure 1:
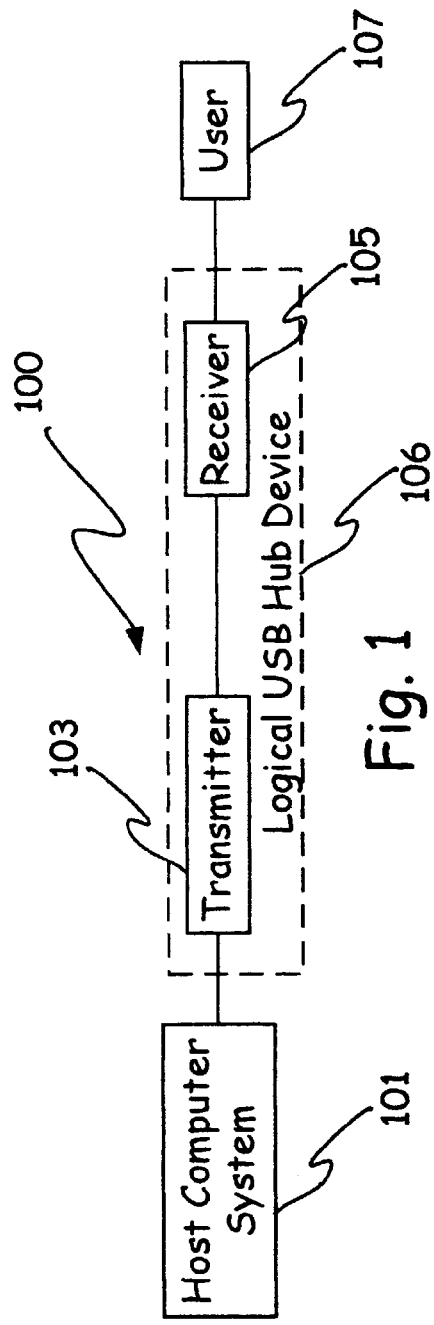
FIG. 1 is a block diagram of a basic computer interface extension solution in accordance with embodiments of the present invention.

A method is provided for extending a universal serial bus (USB) interface through a keyboard, video, mouse (KVM) connection, thus enabling the USB connection to be extended over distances of several hundred meters. The method enables a user to connect a USB device to a remote computer and also enables a USB interface to be extended through a KVM switch. The method eliminates USB signaling formats and latency requirements while remaining transparent to the USB topological environment. The features of the claimed subject matter are relevant, but not limited, to connecting a single user to a remote computer, connecting a single user to multiple systems and connecting a single computer to multiple users.

Briefly, in some embodiments, the method of the claimed subject matter relies upon a split transaction protocol, defined in the USB 2.0 specification, for converting transactions between USB 2.0 signaling and USB 1.1 signaling through a hub. An extension transmitter implements a USB 2.0 hub that attaches using USB 2.0 signaling to a host controller. Devices downstream from the transmitter hub attach as USB 1.1 devices and implement the split transaction protocol.

The split transaction protocol defines separate split start and split complete transactions between the host controller and the 2.0 USB hub to allow slower USB 1.1 transactions to be completed by the downstream devices. The method of the claimed subject matter takes advantage of this feature of the split transaction protocol to hide the extension's electrical layer and latency. Transaction requests and responses are transported across the extension media to and from the receiver in a non-USB format and then re-initiated as USB 1.1 transactions. Hub transactions are described in the USB 2.0 specification, which describes the USB 2.0 to 1.1 translation requirements.

Upstream and downstream transactions are separated by an extension bridge. The transmitter manages the upstream USB 2.0 communication and the receiver manages the downstream USB 1.1 communication. Extension latency is absorbed in the latency between the split start and split complete transactions, which tolerate the additional latency. Thus, the true bus latency meets the USB specification since it is contained between the receiver and the downstream devices.

Various but not other aspects of the present invention are also realized through a method of providing USB connectivity over a keyboard, video, mouse (KVM) connection. The method includes, not necessarily in this order, the steps of: implementing in a KVM transmitter a USB 2.0 hub; attaching the USB 2.0 hub to a host controller using USB 2.0 signaling; attaching a device to a KVM receiver downstream from the USB 2.0 hub as a USB 1.1 device; and communicating with the device using the USB 2.0 split transaction protocol, wherein transaction requests to the device and responses from the device are transported between the KVM transmitter and the KVM receiver in a non-USB format and then each request and response is re-initiated as a corresponding USB 1.1 transaction.

In certain embodiments, the devices of the method include a keyboard, a mouse, a video monitor, a speaker, a serial link, and a microphone. The KVM receiver may be extensibly connected to the KVM transmitter via a fiber optic cable. Of note, the KVM transmitter may eliminate the need for legacy cables being connected to the KVM transmitter. The KVM transmitter may also be external or internal to a host computer system. The transaction requests to the device and responses from the device may even be transported between the KVM transmitter and the KVM receiver in a non-USB format as RF transmissions.

Still other aspects of the present invention may be realized by a communication system for extending range of USB communications that includes a host computer system having a USB host controller, a USB hub, and transmitter circuitry. The USB host controller is configured to operate using a split transaction for the USB communications. The communication system also includes receiver circuitry that receives a non-USB format of USB communication signals as the signals appear between starting and ending split transaction operations at the host computer system. The transmitter circuitry is configured to forward the non-USB formatted USB communication signals across an extension between the transmitter circuitry and the receiver circuitry. At least one USB user interface device is communicatively coupled to the receiver circuitry and receives USB communication signals from a receiver hub in the receiver circuitry. The USB communication signals correspond to the non-USB formatted communication signals that appear between the starting and ending of the split transaction operation at the host computer system.

As stated above, the at least one USB user interface device may be a keyboard, a mouse, a video monitor, a speaker, a serial link, and a microphone. The receiver circuitry of the communication system may be extensibly connected to the transmitter circuitry via a fiber optic cable. The transmitter circuitry may eliminate the need for legacy cables between the host computer system and the transmitter circuitry. As discussed herein, one embodiment for the transmitter circuitry is internal to the host computer system while another is external to the host computer system.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

FIG. 1 is a block diagram of a basic computer interface extension solution 100 according to embodiments of the present invention. The solution 100 is illustrated as having a host computer system 101 with an extension transmitter 103 (herein referred to as "transmitter"). The transmitter 103 is connected to an extension receiver 105 (herein referred to as "receiver") which may be considered to be a single logical device, a logical USB hub device 106, that is connected to a user 107. The user 107 is representative of standard user interface products such as a keyboard, mouse, monitor, serial port, audio devices, USB ports, etc. The solution 100 is commonly implemented as a KVM extension, however, as will be understood when viewing the description of the invention, the solution 100 includes more than typical KVM extension capabilities. Further, although data travels bi-directionally between the host computer system 101 and the user 107, in accordance with the USB specification terminology, the transmitter 103 and the receiver 105 are described as though data transfer occurs only in one direction, i.e., from the host computer system 101 to the user 107.

The transmitter 103 and receiver 105, i.e., the logical USB hub device 106, are connected with a single cable such as a cable compatible with all versions of category 5, 6, 7, or better cables. The connection could also be made with fiber optic or other type of high speed data transmission cabling. The distance between the transmitter 103 and receiver 105 ranges approximately 300 meters. In this manner are the user interface devices of the user 107 allowed to communicate effectively with the host computer system 101 across long distances, "long" as compared to user/host communication distances in a system without the transmitter 103/receiver 105 pair. Although illustrated external to the host 101, the transmitter 103 may be positioned internal to the host computer system 101 and use an internal connector with the motherboard of the system 101.

Figure 2:
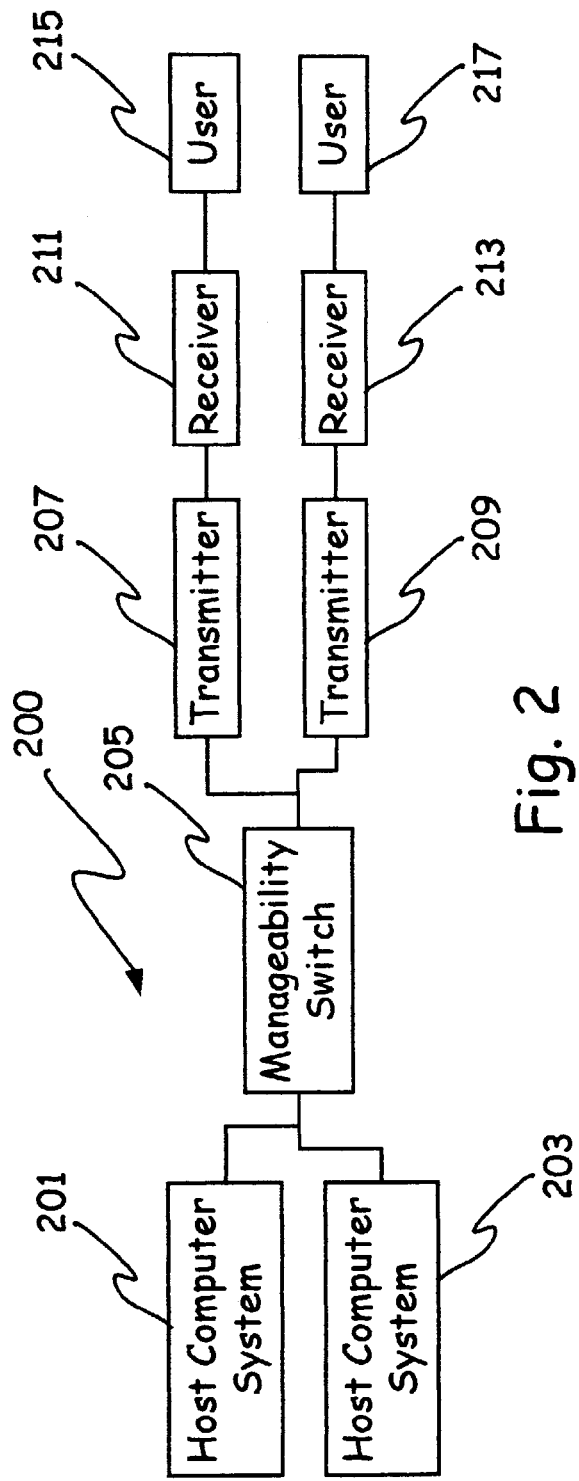
FIG. 2 is a block diagram of another basic computer interface extension solution wherein a manageability switch is introduced into the solution in accordance with embodiments of the present invention.

FIG. 2 is a block diagram of another basic computer interface extension solution 200 wherein a manageability switch 205 is introduced into the solution, which includes multiple host computer systems 201 and 203. The solution 200 also includes multiple transmitters 207 and 209, and multiple receivers 211 and 213 that support the communication extension for multiple users 215 and 217, respectively. The manageability switch 205 encompasses technology used to map a specific user to a specific system, to converge a large number of systems to a small number of users for system administration or head trader access, and to share a single system between two or more users.

Figure 3:
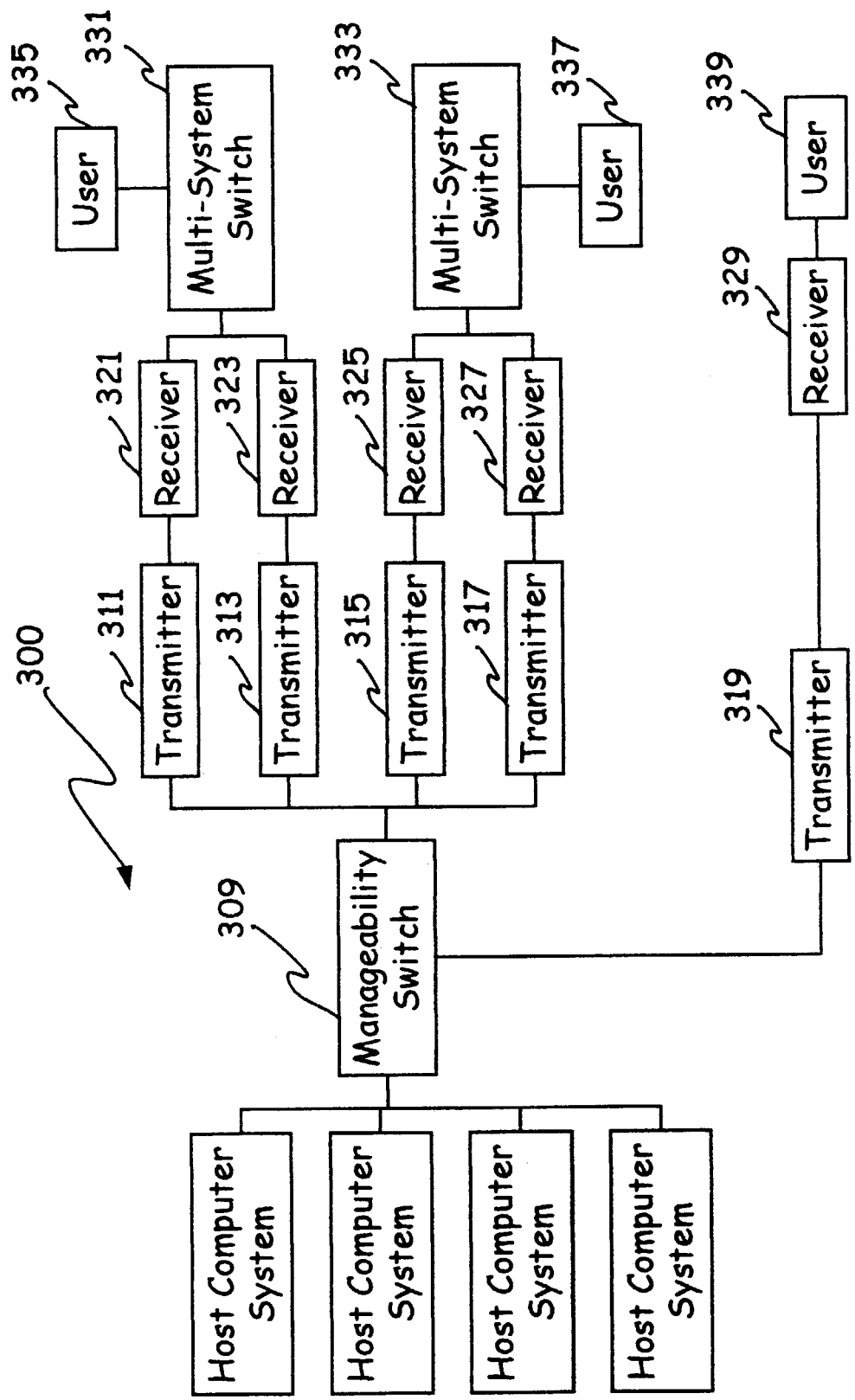
FIG. 3 is a block diagram of a computer interface extension solution wherein a manageability switch and multi-system switches are introduced into the solution in accordance with embodiments of the present invention.

FIG. 3 is a block diagram of a computer interface extension solution 300 wherein a manageability switch 309 and multi-system switches 331 and 333 are introduced into the solution 300. The multi-system switches 331 and 333 enable users 335 and 337 to access multiple transmitter/receiver pairs; i.e. a transmitter/receiver pair 311 and 321 and a transmitter/receiver pair 313 and 323 in the case of user 335 and a transmitter/receiver pair 315 and 325 and a transmitter/receiver pair 317 and 327 in the case of user 337. An administrative user 339 is also illustrated that provides the capability to monitor the users 337 and 335 and make adjustments to the solution 300 configuration if necessary. The administrative user 339 accesses the manageability switch 309 via a transmitter/receiver pair 319 and 329.

Figure 4:
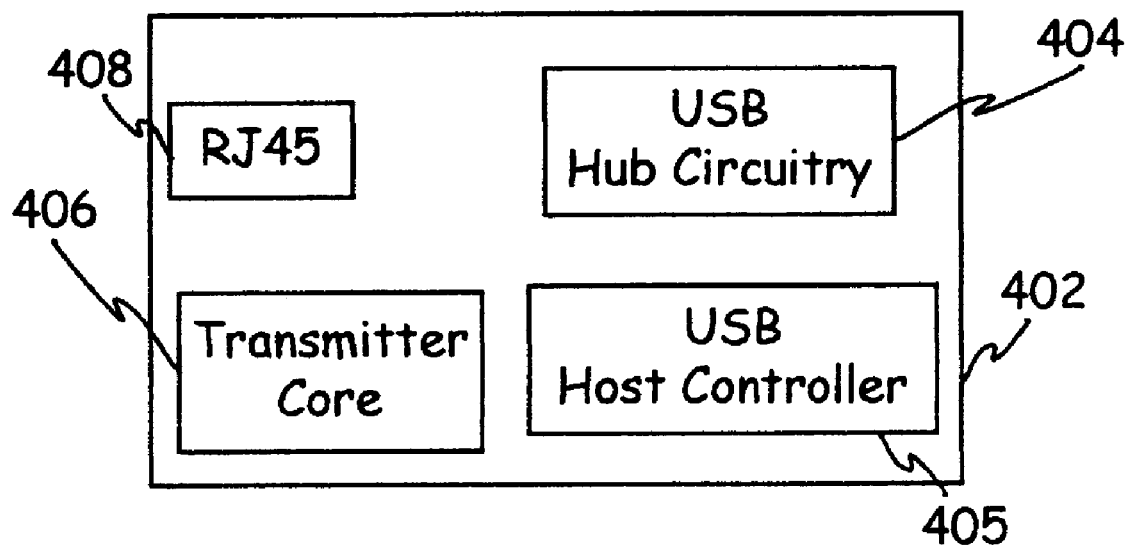
FIG. 4 is a simplified block diagram of exemplary transmitter circuitry components that are used in an extension transmitter in accordance with embodiments of the present invention.

FIG. 4 is a simplified block diagram of exemplary transmitter circuitry components 402 that are used in an extension transmitter (e.g., transmitter 103) according to certain but not other principles of the present invention. The transmitter components 402 employ the techniques of the claimed subject matter. The transmitter circuitry components 402 are configured to support the transmitter 103 in an extension solution such as the extension solution 100. However, unlike transmitter circuitry of the prior art, the transmitter circuitry 402 includes a USB hub circuitry 404 and USB host controller 405. The USB hub circuitry and host controller 404 and 405 are introduced such that the transmitter circuitry components 402 operate with a USB protocol to support USB devices such as a keyboard and mouse operating at the user 107 end of the solution 100. The transmitter components 402 also include a transmitter core 406 and a communication link to a receiver, e.g., receiver 105, represented by RJ45 connector 408.

Figure 5:
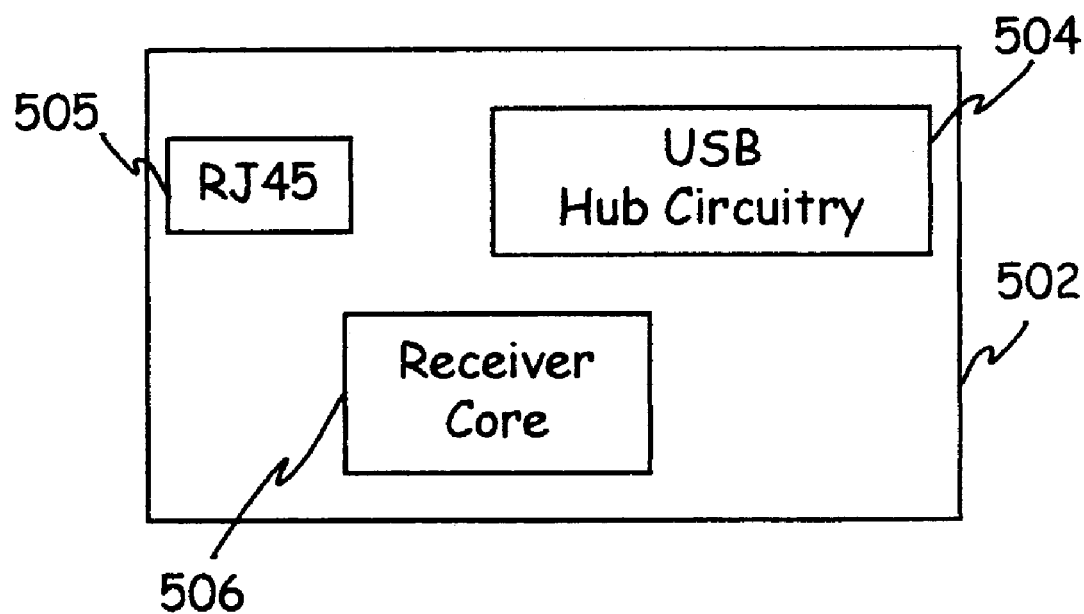
FIG. 5 is a simplified block diagram of exemplary receiver circuitry components that are used in an extension receiver in accordance with embodiments of the present invention.

FIG. 5 is a simplified block diagram of exemplary receiver circuitry components 502 that are used in an extension receiver (e.g., receiver 105) according to certain but not other principles of the present invention. The receiver circuitry components 502 include a USB hub circuitry 504, a receiver core 506, and a communication link represented by RJ45 connector 505. Due at least in part to the transmitter core 406, the USB hub circuitry 404 operation is as defined in USB 2.0 specification chapter 11 which describes the USB 2.0 to 1.1 translation requirements for split transactions.

The split transaction protocol defined in the USB 2.0 specification defines the converting of transactions between 2.0 signaling and 1.1 signaling through a hub. The transmitter 402 implements the USB hub circuitry 404 which attaches using 2.0 signaling to the host controller 405. All devices downstream from the USB hub circuitry 504 attach as 1.1 devices, thus requiring the split transaction protocol as defined in the USB 2.0 specification and described further herein. The split transaction protocol defines separate split start and split complete transactions between the host controller 405 and the USB hub circuitry 404 to allow the slower USB 1.1 transaction to be completed downstream from the USB hub circuitry 504.

This split transaction format provides an opportunity to hide the extension electrical layer and latency. The transaction requests and responses are transported across the extension media to and from the receiver in a non-USB format where the transaction is re-initiated as USB 1.1 transactions. The transmitter circuitry 402 manages the upstream 2.0 communication and the receiver circuitry 502 manages the downstream 1.1 communication. The extension latency is absorbed in the latency between the split start and split compete transactions which tolerate the additional latency and the true bus transaction latency still meets the USB specification since it is contained entirely between the receiver and the local downstream devices (e.g., between the receiver 105 and the user 107).

Figure 6:
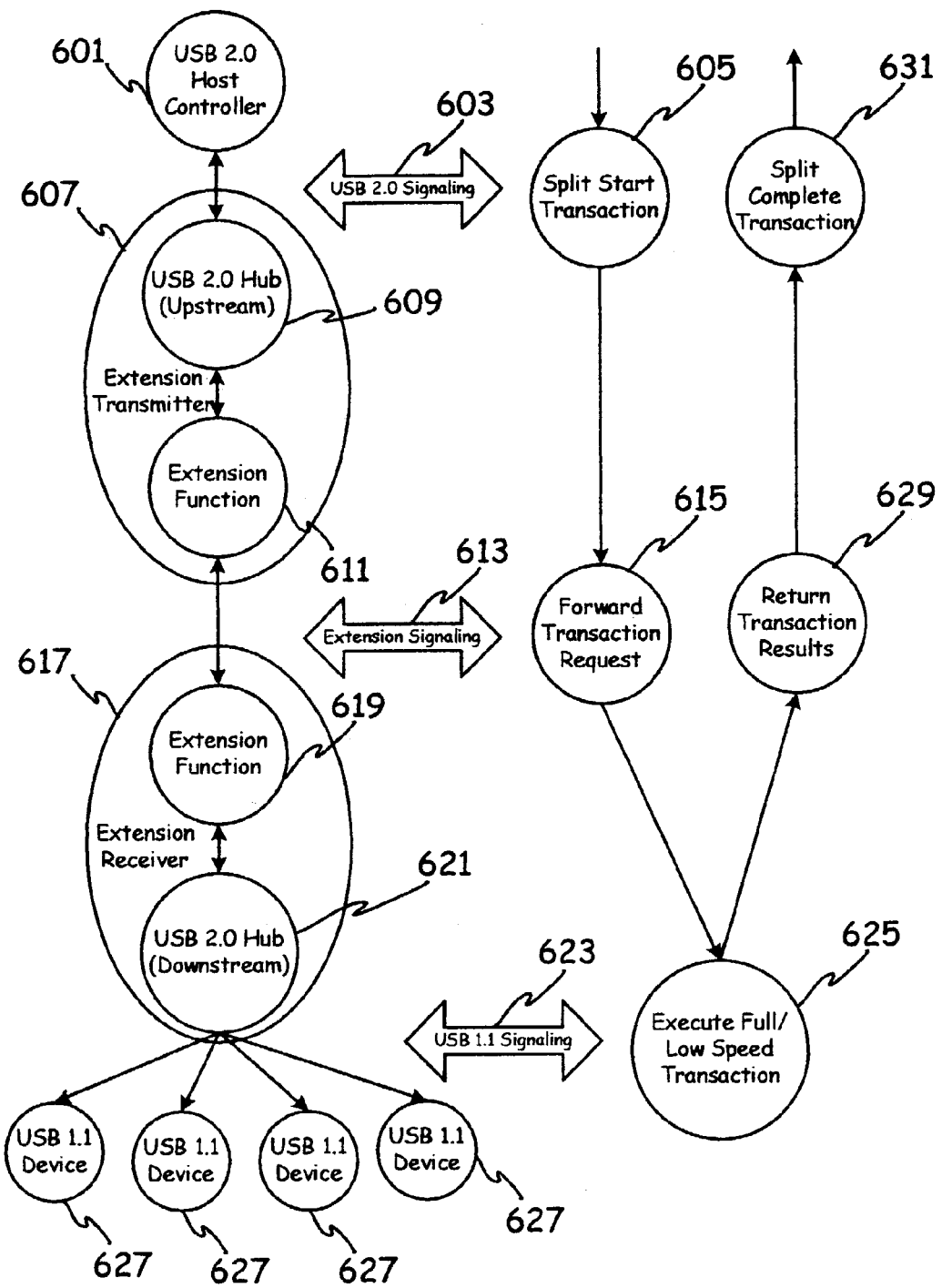
FIG. 6 is a flow diagram of the extension topology and operational flow of a basic computer interface extension solution incorporating USB split transactions in accordance with embodiments of the present invention.

FIG. 6 is a flow diagram of the extension topology and operational flow of a basic computer interface extension solution incorporating USB split transactions according to certain but not other aspects of the present invention. In the illustrated embodiment, a USB 2.0 Host Controller 601 operates at a host computer where USB 2.0 signaling 603 begins a split start transaction 605. An extension transmitter 607 includes a USB 2.0 hub 609 and an extension function 611. The extension function 611 coordinates extension signaling 613 such that non-USB signals may be forwarded by a forward transaction request 615 to an extension receiver 617. The extension receiver 617 includes an extension function 619 that operates in conjunction with other USB 2.0 hub circuitry 621. With the assistance of at least the extension function 619, the USB hub 621 performs USB 1.1 signaling 623 to execute full/low speed transactions 625 with at least one USB 1.1 device 627.

In a similar manner, USB signals are sent to the USB 2.0 host controller 601 by passing from a USB 1.1 device 627 to the USB 2.0 hub 621 where the extension function 619 aids in the extension signaling 613 to send return transaction results 629. A split complete transaction 631 may then begin for the particular USB signaling that is being extended.

In other words, the USB 2.0 host controller 601 communicates with the extension transmitter 607, which includes the upstream USB 2.0 hub 609 and the extension function 611, via USB 2.0 signaling 603. The extension function 611 communicates via extension signaling 613 with the corresponding extension function 619 in the extension receiver 617. As previously stated, the extension receiver 617 includes the downstream USB 2.0 hub 621. The extension receiver 617 communicates via USB 1.1 signaling 623 to several USB 1.1 devices 627. It should be noted that the terms "upstream" and "downstream" with respect to the USB 2.0 hub 609 and the USB 2.0 hub 621 are used in accordance with USB specification terminology. Thus, in actual practice the communication is bi-directional so that what is upstream in one example could be downstream in another, and vice versa.

Figure 7:
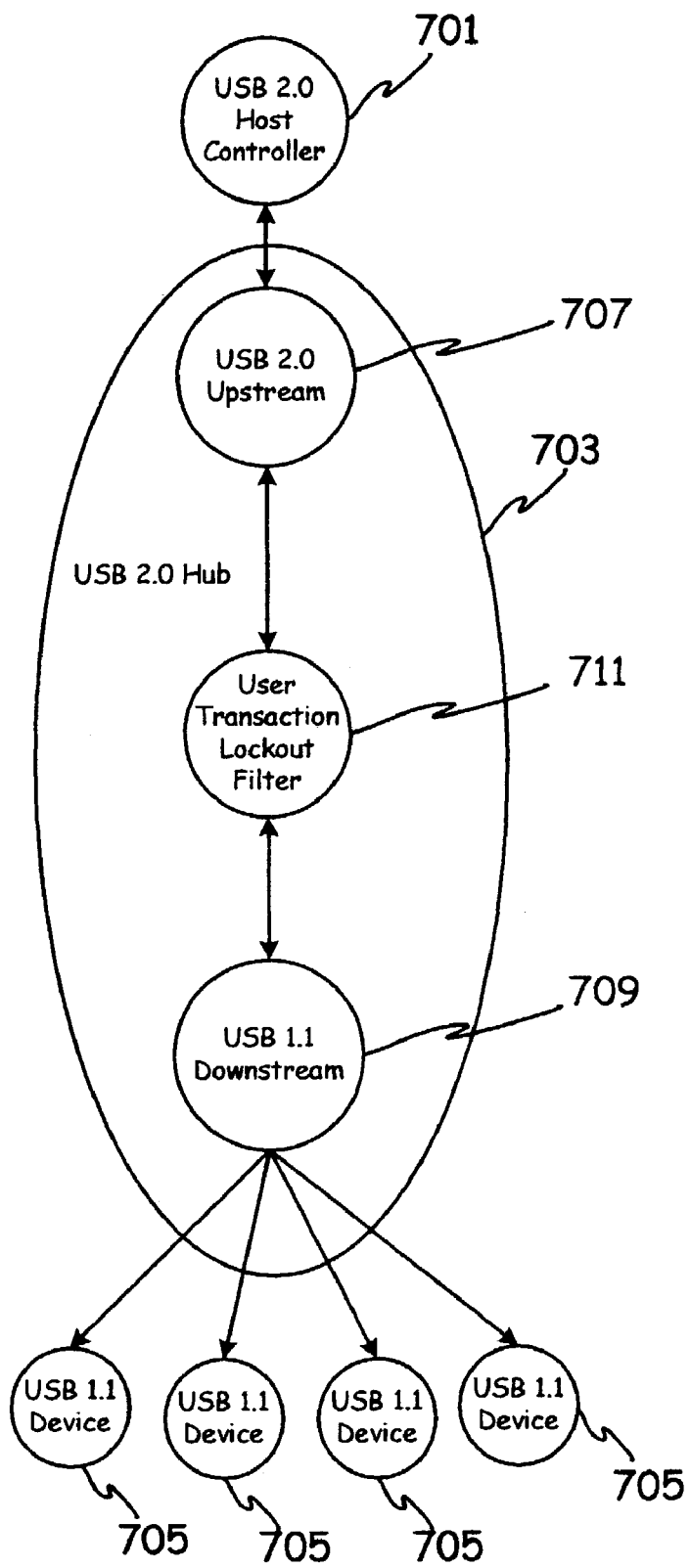
FIG. 7 is a diagram of data flow in accordance with embodiments of the present invention.

FIG. 7 is a diagram of the data flow of the method of the claimed subject matter as it applies to a USB multi-user switch. A USB 2.0 host controller 701 communicates with a logical USB 2.0 hub 703 in order to communicate with USB 1.1 devices 705. The logical USB 2.0 hub 703 communicates USB 2.0 upstream 707 and USB 1.1 downstream 709. A user transaction lockout filter 711 is introduced to facilitate the non-USB signals that are the subject of the extension as previously described more fully herein.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

While various embodiments of the invention have been described, it will be apparent to those of ordinary skill in the art that many more embodiments and implementations are possible that are within the scope of this invention.

What is claimed is:

1. A method of providing universal serial bus (USB) connectivity over a keyboard, video, mouse (KVM) connection, comprising:
    implementing in a KVM transmitter a first USB hub circuitry;
    attaching the first USB hub circuitry to a host controller using USB 2.0 signaling;
    attaching at least one device to a KVM receiver downstream from the first USB hub circuitry, the KVM receiver having a second USB hub circuitry; and
    communicating with the second USB hub circuitry using the USB 2.0 split transaction protocol, wherein transaction requests to the second USB hub circuitry and responses from the second USB hub circuitry are transported between the KVM transmitter and the KVM receiver in a non-USB format and then each request and response is re-initiated as a corresponding USB transaction.

2. The method of claim 1 wherein the at least one device comprise a keyboard, a mouse, a video monitor, a speaker, a serial link, and a microphone.

3. The method of claim 1 wherein the KVM receiver is extensibly connected to the KVM transmitter via a fiber optic cable.

4. The method of claim 1 wherein the KVM transmitter eliminates the need for legacy cables being connected to the KVM transmitter.

5. The method of claim 1 wherein the KVM transmitter is internal to a host computer system.

6. The method of claim 1 wherein the KVM transmitter is external to a host computer system.

7. The method of claim 1 wherein the transaction requests to the device and responses from the device are transported between the KVM transmitter and the KVM receiver in a non-USB format as RF transmissions.

8. A communication system for extending range of USB communications comprising:
    a host computer system having a USB host controller, a first USB hub circuitry, and transmitter circuitry, the USB host controller being configured to operate using a split transaction for the USB communications;
    receiver circuitry having a second USB hub circuitry that receives a non-USB format of USB communication signals as the signals appear between split start and split complete transaction operations at the host computer system, the transmitter circuitry being configured to forward the non-USB formatted USB communication signals across an extension between the transmitter circuitry and the receiver circuitry;
    at least one USB user interface device communicatively coupled to the receiver circuitry that receives USB communication signals from the second USB hub circuitry, the USB communication signals corresponding to the non-USB formatted communication signals that appear between the split start and split complete transaction operations at the host computer system.

9. The communication system of claim 8 wherein the at least one USB user interface device comprises a keyboard, a mouse, a video monitor, a speaker, a serial link, and a microphone.

10. The communication system of claim 8 wherein the receiver circuitry is extensibly connected to the transmitter circuitry via a fiber optic cable.

11. The communication system of claim 8 wherein the transmitter circuitry eliminates the need for legacy cables between the host computer system and the transmitter circuitry.

12. The communication system of claim 8 wherein the transmitter circuitry is internal to the host computer system.

13. The communication system of claim 8 wherein the transmitter circuitry is external to the host computer system.

14. The communication system of claim 8 wherein the transmitter circuitry transmits the non-USB formatted communication signals to the receiver circuitry via RF transmission.

* * * * *